United States Patent
Kawakami

(10) Patent No.: US 9,834,041 B2
(45) Date of Patent: Dec. 5, 2017

(54) PNEUMATIC TIRE

(75) Inventor: Yuki Kawakami, Rome (IT)

(73) Assignee: BRIDGESTONE CORPORATION, Chuo-ku, Tokyo (JP)

( * ) Notice: Subject to any disclaimer, the term of this patent is extended or adjusted under 35 U.S.C. 154(b) by 80 days.

(21) Appl. No.: 14/343,246

(22) PCT Filed: Sep. 7, 2012

(86) PCT No.: PCT/JP2012/073550
§ 371 (c)(1),
(2), (4) Date: Mar. 7, 2014

(87) PCT Pub. No.: WO2013/035889
PCT Pub. Date: Mar. 14, 2013

(65) Prior Publication Data
US 2014/0224395 A1  Aug. 14, 2014

(30) Foreign Application Priority Data
Sep. 9, 2011  (JP) .................... 2011-197266

(51) Int. Cl.
B60C 11/12 (2006.01)
B60C 11/13 (2006.01)
B60C 11/03 (2006.01)

(52) U.S. Cl.
CPC ........ B60C 11/1218 (2013.01); B60C 11/032 (2013.01); B60C 11/0306 (2013.01); B60C 11/1315 (2013.01); B60C 11/1281 (2013.01); B60C 2011/0348 (2013.01); B60C 2011/0381 (2013.01); B60C 2011/0388 (2013.01); B60C 2011/1254 (2013.01); B60C 2011/133 (2013.01)

(58) Field of Classification Search
CPC ............. B60C 11/1218; B60C 11/1281; B60C 11/1204; B60C 11/1376; B60C 11/1392; B60C 2011/0381; B60C 2011/0383; B60C 11/1263; B60C 11/1315; B60C 2011/133
See application file for complete search history.

(56) References Cited

U.S. PATENT DOCUMENTS 4,884,606 A * 12/1989 Matsuda ................. B60C 11/12
152/209.18
2011/0005652 A1  1/2011  Ono et al.

FOREIGN PATENT DOCUMENTS

| CN | 101168343 A | 4/2008 |
| JP | S59-102409 U * | 7/1984 |
| JP | 1-108803 U | 7/1989 |

(Continued)

OTHER PUBLICATIONS

English machine translation of JP2007-230399, dated Sep. 2007.*
(Continued)

Primary Examiner — Robert Dye
(74) Attorney, Agent, or Firm — Sughrue Mion, PLLC

(57) ABSTRACT

A pneumatic tire that lowers a temperature of a tread portion by promoting heat dissipation thereof is provided. On a tread surface, a narrow groove is formed extending in a direction inclined with respect to a tire circumferential direction and having a width smaller than a depth, and an inflow portion opening to the tread surface is also formed on at least one of walls of the narrow groove facing each other in the tire circumferential direction.

9 Claims, 11 Drawing Sheets
(1 of 11 Drawing Sheet(s) Filed in Color)

(56) References Cited

FOREIGN PATENT DOCUMENTS

| JP | 5-96913 A | 4/1993 |
| JP | 7-52613 A | 2/1995 |
| JP | 2001-055017 | * 2/2001 |
| JP | 2003-205706 A | 7/2003 |
| JP | 2007-191093 A | 8/2007 |
| JP | 2007-230399 A | 9/2007 |
| JP | 2008-13037 A | 1/2008 |
| JP | 2009-227264 A | 10/2009 |
| JP | 2010-052683 | * 3/2010 |

OTHER PUBLICATIONS

English machine translation of JP2010-052683, dated Mar. 2010.*
English machine translation of JP07-052613, dated Feb. 1995.*
English machine translation of JPH05-096913, dated Apr. 1993.*
English machine translation of JP2001-055017, dated Feb. 2001.*

Canadian Office Action issued in Canadian Application No. 2,848,908 dated Oct. 24, 2014.
Japanese Office Action issued in Japanese Application No. 2013-532695 dated Oct. 7, 2014.
International Search Report for PCT/JP2012/073550 dated Dec. 4, 2012.
Communication dated Apr. 9, 2015, issued by the Russian Patent Office in counterpart Application No. 2014113916/11.
Communication dated Sep. 6, 2015 from the State Intellectual Property Office of the People's Republic of China in counterpart Application No. 201280043549.8.
Communication dated Mar. 25, 2015, issued by the Australian Government IP Australia in counterpart Australian Patent Application No. 2012305209.
Communication dated Mar. 27, 2015 from the European Patent Office in counterpart European Application No. 12829571.4.
Communication dated Apr. 6, 2016 from the State Intellectual Property Office of the P.R.C. in counterpart application No. 201280043549.8.

* cited by examiner

FIG. 1
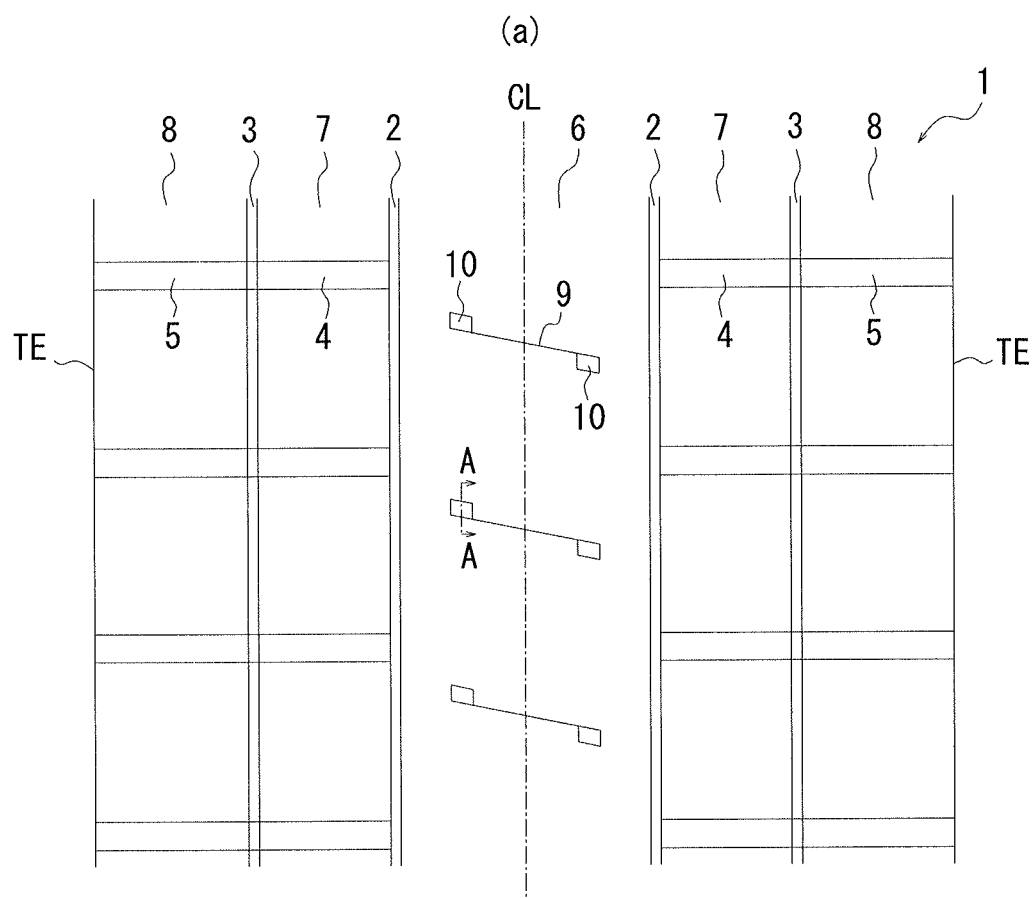
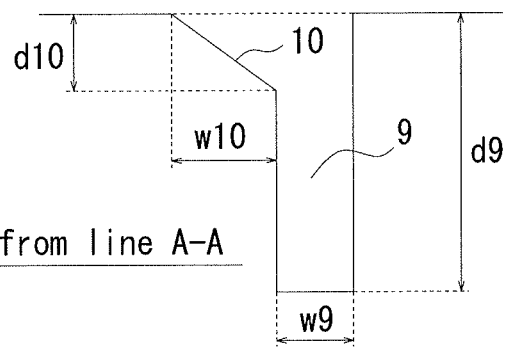
Cross-section taken from line A-A

FIG. 2
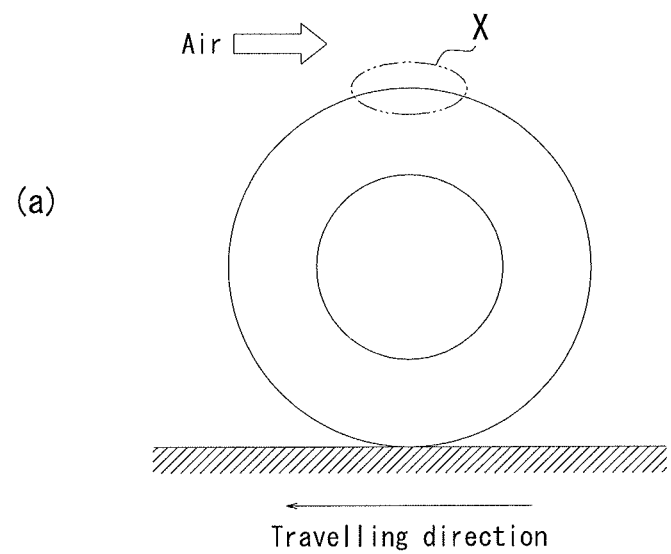
(a)
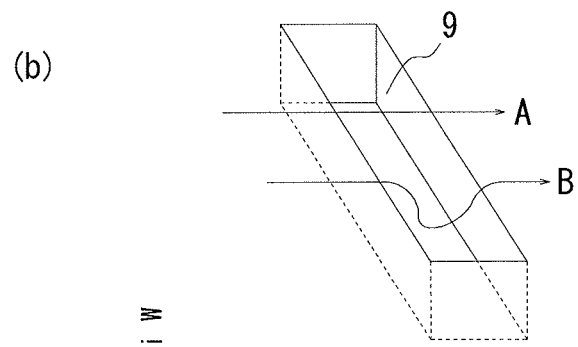
(b)
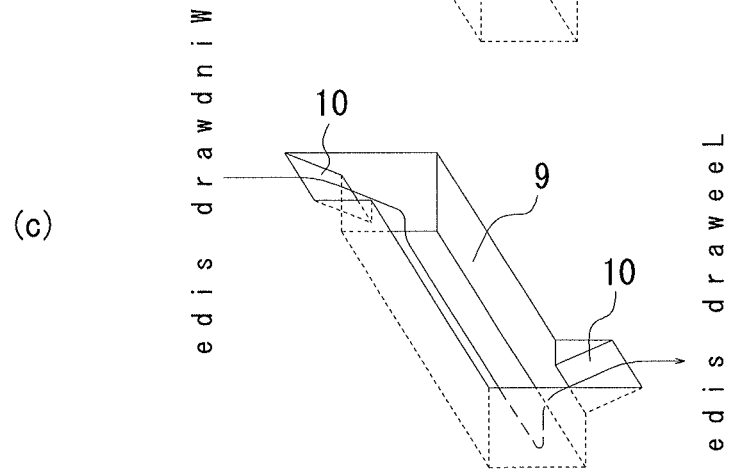
(c)

PNEUMATIC TIRE

CROSS REFERENCE TO RELATED APPLICATIONS

This application is a National Stage of International Application No. PCT/JP2012/073550 filed Sep. 7, 2012, claiming priority based on Japanese Patent Application No. 2011-197266 filed Sep. 9, 2011, the contents of all of which are incorporated herein by reference in their entirety.

TECHNICAL FIELD

The present invention relates to a pneumatic tire that lowers the temperature of a tread portion by promoting heat dissipation thereof, and more specifically, to a pneumatic tire for a construction vehicle.

BACKGROUND ART

When the tread portion generates heat during rotation of the tire with a load applied thereon, the temperature of the tread portion rises, causing various failures such as heat separation of the tread portion and the like. Therefore, in order to lower the temperature of the tread portion, it is necessary to reduce the heat generation or to promote heat dissipation.

Conventionally, in order to lower the temperature of the tread portion, there has been employed a method of forming grooves in the tread portion by removing tread rubber that serves as a heat source and, simultaneously, increasing a surface area of the tread portion such that the heat dissipation is enhanced (For example, Patent Document 1).

RELATED ART DOCUMENT

Patent Document

Patent Document 1: Japanese Patent Application Laid-Open Publication No. 2003-205706

SUMMARY OF INVENTION

Technical Problem

However, the method described above needs to increase the number of grooves in order to improve an effect to lower the temperature. Such an increase in the number of grooves, however, leads to a reduction in rigidity of a land portion, causing deterioration of antiwear performance and steering stability.

As such, an object of the present invention is to provide a pneumatic tire having a minimized increase in a groove area, thereby promoting the heat dissipation of the tread portion and lowering the temperature thereof.

Solution to Problem

A summary of the present invention is as follows:
(1) A pneumatic tire includes:
 a narrow groove formed on a tread surface, the narrow groove extending in a direction inclined with respect to a tire circumferential direction and having a width smaller than a depth; and
 an inflow portion opening to the tread surface, the inflow portion being formed on at least one of walls of the narrow groove facing each other in the tire circumferential direction.

(2) The pneumatic tire according to (1) set forth above, wherein the narrow groove has either end terminated within a land portion.

(3) The pneumatic tire according to (1) or (2) set forth above, wherein the inflow portion has a deepest portion on a side opening to the wall of the narrow groove.

(4) The pneumatic tire according to (3) set forth above, wherein a depth of the inflow portion gradually increases toward the side opening to the wall of the narrow groove.

(5) The pneumatic tire according to any one of (1) to (4) set forth above, wherein the inflow portion is formed in a portion of a longitudinal direction of the narrow groove.

(6) The pneumatic tire according to any one of (1) to (5) set forth above, wherein the inflow portion is formed on both of the walls of the narrow groove.

(7) The pneumatic tire according to (6) set forth above, wherein, between a center, along with the longitudinal direction of the narrow groove, of the inflow portion formed on one of the walls of the narrow groove and a center, along with the longitudinal direction of the narrow groove, of the inflow portion formed on the other wall of the narrow groove, a gap is provided in the longitudinal direction of the narrow groove.

Effect of the Invention

According to the present invention, since an increase in a groove area is minimized, a pneumatic tire that, without incurring a reduction in rigidity of a land portion, promotes heat dissipation of the tread portion and lowers the temperature thereof may be provided.

BRIEF DESCRIPTION OF DRAWINGS

The patent or application file contains at least one drawing executed in color. Copies of this patent or patent application publication with color drawing(s) will be provided by the Office upon request and payment of the necessary fee.

FIG. 1($a$) is a developed view of a tread pattern of a pneumatic tire according to the present invention, and FIG. 1($b$) is a cross-sectional view taken from line A-A of FIG. 1($a$);

FIGS. 2($a$) to ($c$) are diagrams illustrating a function of the present invention;

DESCRIPTION OF EMBODIMENT

Figure 3:
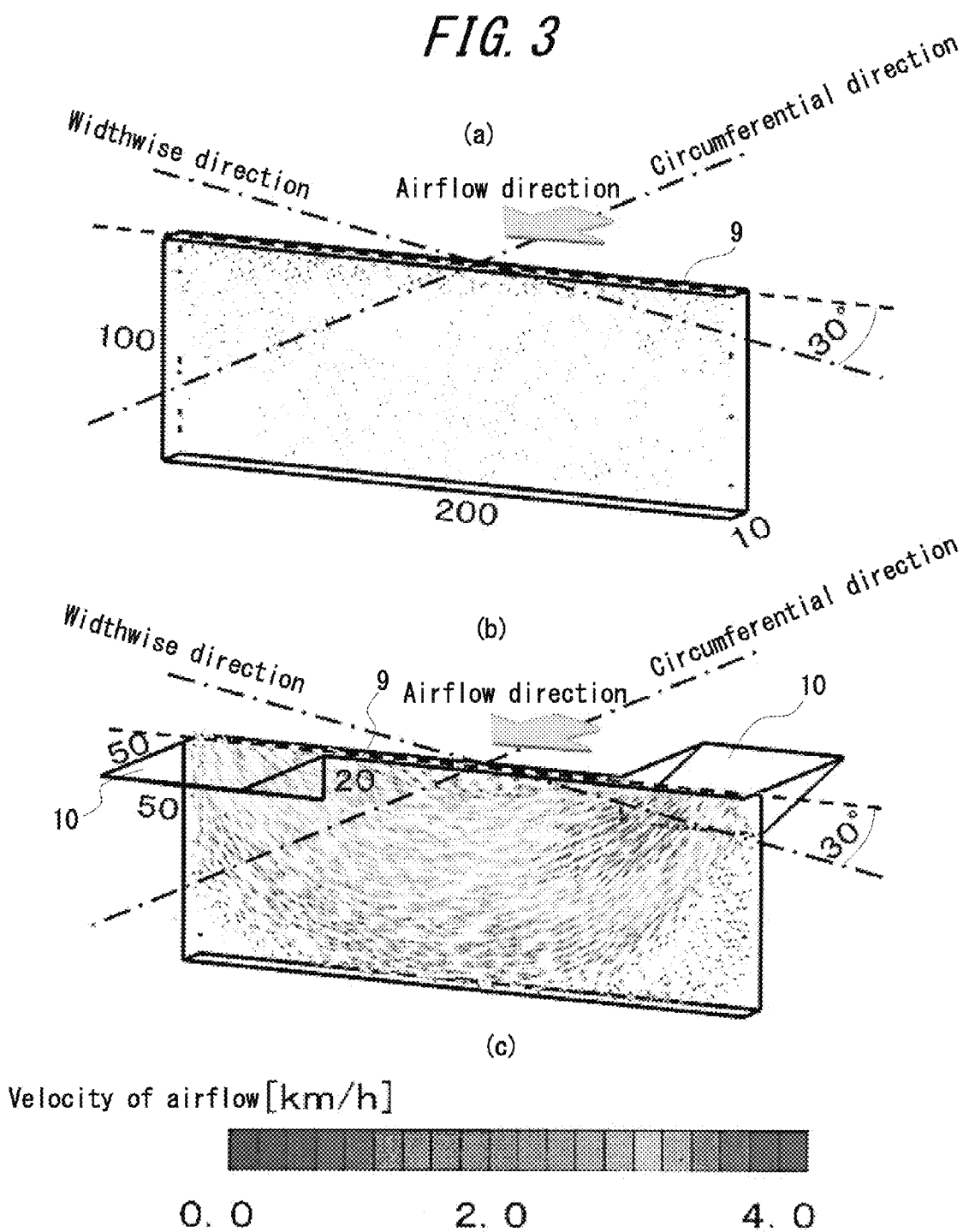
FIGS. 3($a$) to ($c$) are diagrams illustrating an air velocity vector inside a narrow groove.
Figure 4:
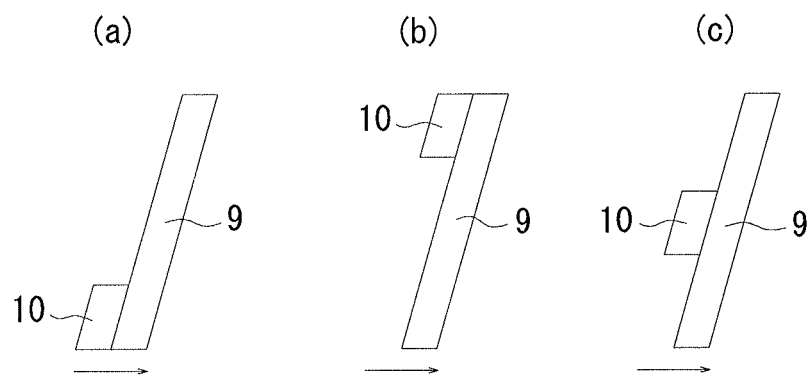
FIGS. 4($a$) to ($c$) are diagrams illustrating variations of an inflow portion.
Figure 5:
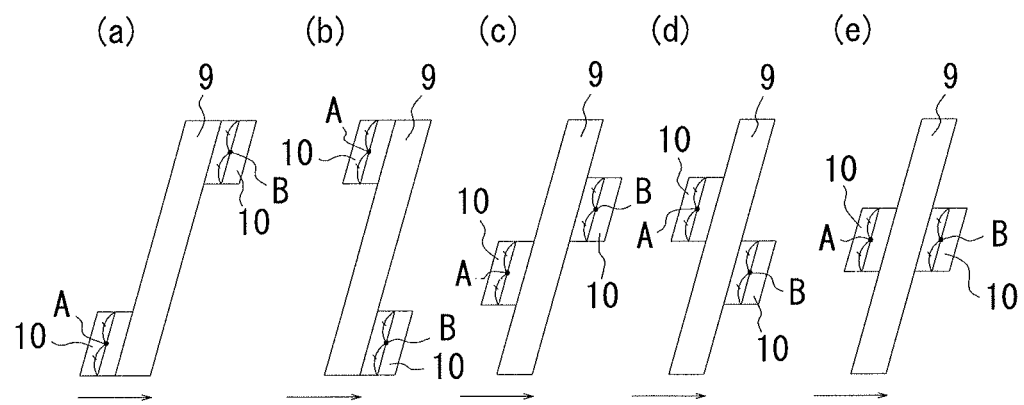
FIGS. 5($a$) to ($e$) are diagrams illustrating variations of the inflow portion.
Figure 6:
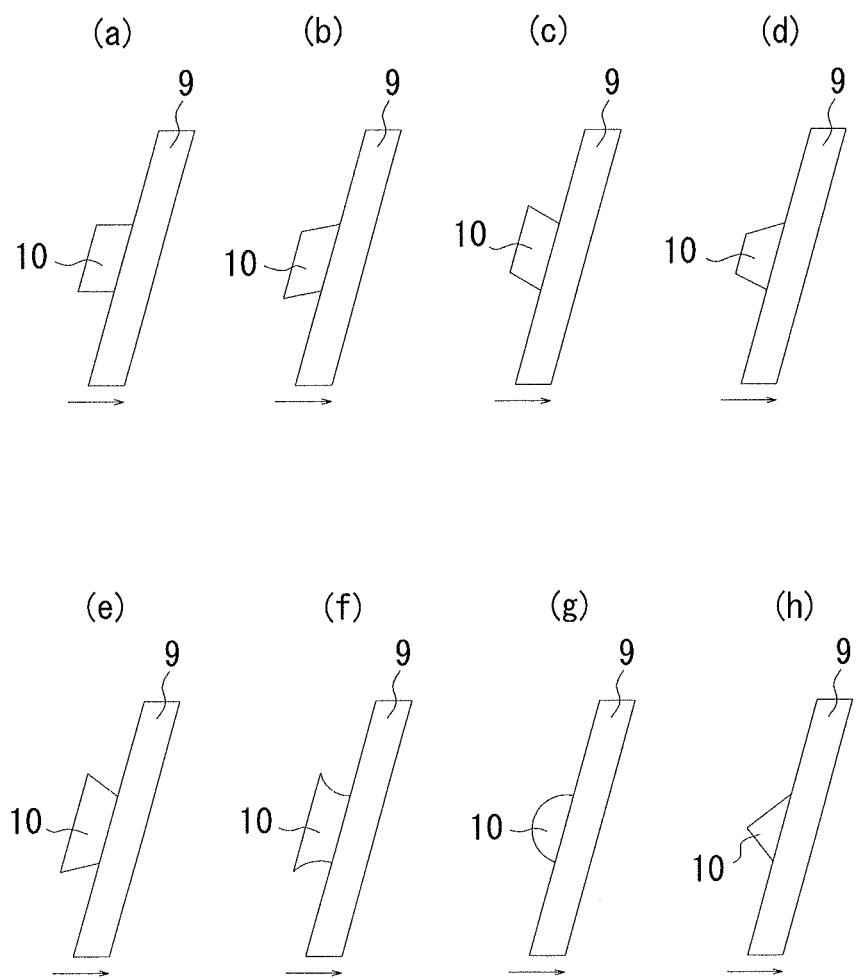
FIGS. 6($a$) to ($h$) are diagrams illustrating variations of the inflow portion.
Figure 7:
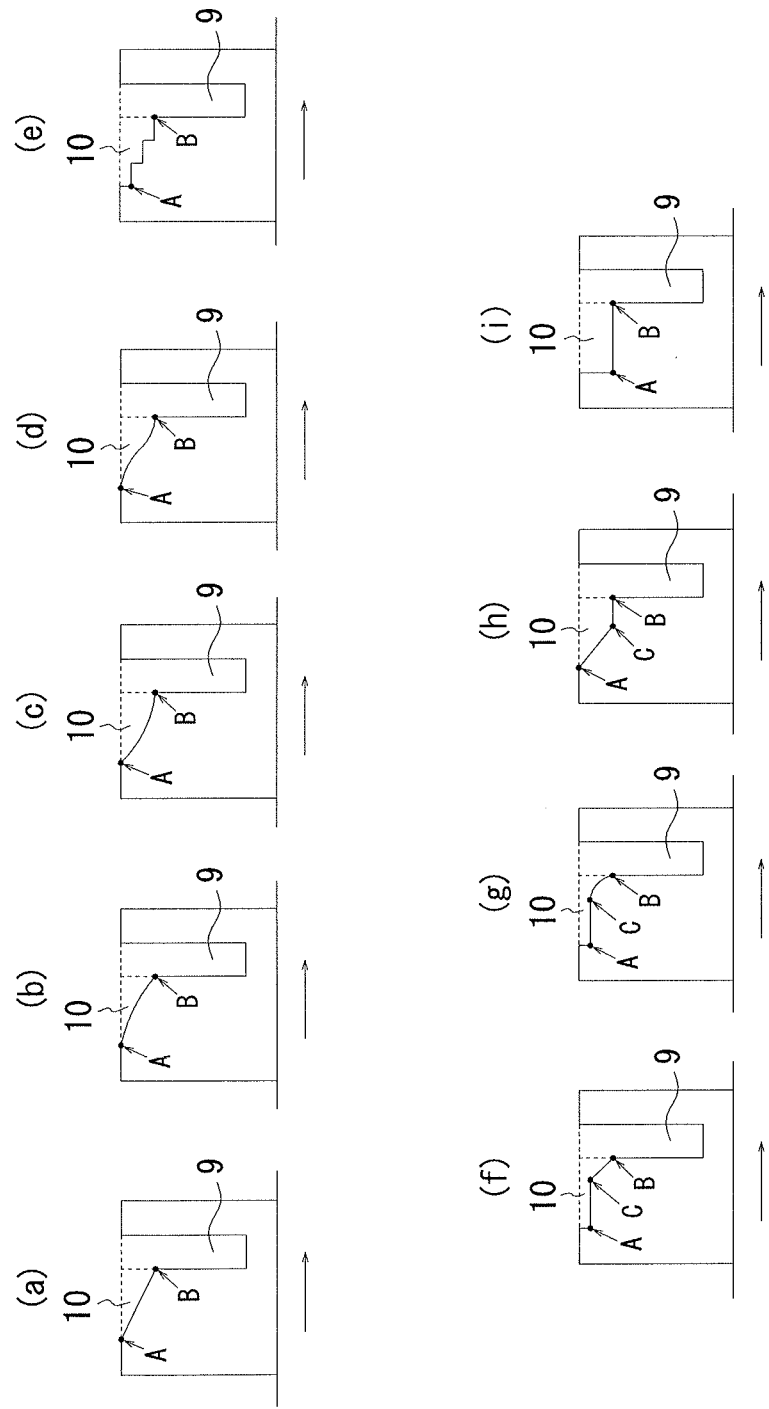
FIGS. 7($a$) to ($i$) are diagrams illustrating variations of the inflow portion.

The following is a detailed description of a pneumatic tire according to the present invention with reference to the accompanying drawings.

FIG. 1(a) is a developed view of a tread pattern of the pneumatic tire according to the present invention. A tread surface 1 includes: a pair of central circumferential grooves 2 extending along a tire circumferential direction across a tire equatorial plane CL; a pair of side circumferential grooves 3 extending along the tire circumferential direction outside the central circumferential grooves 2 with respect to a tire width direction; an intermediate widthwise groove 4 extending along the tire width direction and communicating with the central circumferential groove 2 and the side circumferential groove 3; and a side widthwise groove 5 extending along the tire width direction and communicating with the side circumferential groove 3 and a treat end TE.

A rib-shaped central land portion 6 including the tire equatorial plane CL is formed by a pair of central circumferential grooves 2. Also, a block-shaped intermediate land portion 7 is formed by the central circumferential groove 2, the side circumferential groove 3, and the intermediate widthwise groove 4. Further, a block-shaped side land portion 8 is formed by the side circumferential groove 3 and the side widthwise groove 5.

Note that the tread pattern is illustrated in the figure by way of example, and the present invention is applicable to both rib trend patterns and block trend patterns. Also, the intermediate widthwise groove 4 and the side widthwise groove 5 may be inclined with respect to the tire width direction and, also, may have a non-constant width. Further, the side widthwise groove 5 does not need to be communicating with the tread end TE.

In the rib-shaped central land portion 6, narrow grooves 9 are formed extending in a direction inclined with respect to the tire circumferential direction. As illustrated in FIG. 1(b), a width w9 of the narrow groove 9 is smaller (narrower) than a depth d9.

Also, on walls of the narrow groove 9 facing each other in the tire circumferential direction, inflow portions 10 are formed opening to the tread surface.

Note that an arrangement of the narrow grooves is illustrated in the figure by way of example, and the narrow grooves of the present invention may be formed, other than in the rib-shaped central land portion 6, in the block-shaped intermediate land portion 7 or in the block-shaped side land portion 8. Also, the narrow groove 9 may be inclined at any angle of θ (0<θ≥90) degrees with respect to the tire circumferential direction, and preferably inclined at an angle between 0 and 60 degrees with respect to the tire width direction.

Further, a plurality of narrow grooves 9 do not need to be formed in parallel with each other. Although the narrow grooves 9 preferably have either end terminated within the rib-shaped central land portion 6 as illustrated in the figure by way of example from a viewpoint of ensuring rigidity of the rib-shaped central land portion 6, the narrow grooves 9 may have either end opening to the central circumferential grooves 2.

The following is a description of a function of the present invention.

As illustrated in FIG. 2 (a), when the tire rotates, the air around the tire flows in a direction opposite to a traveling direction. Taking this air into the grooves formed on the tread surface 1 allows for heat dissipation of the tread portion lowering the temperature thereof. When a wide groove is formed on the tread surface 1, although the air may be taken into the groove, rigidity of the land portion is reduced and antiwear performance and steering stability are deteriorated. On the other hand, when a groove is formed having a width that is narrow enough not to reduce the rigidity of the land portion, the air may not be taken into the groove. That is, as illustrated in FIG. 2(b) illustrating a part denoted by X in FIG. 2(a), the air mostly passes over the narrow groove 9 formed on the tread surface 1 as indicated by an arrow A and only some of the air is taken into the narrow groove 9 as indicated by an arrow B. However, the air indicated by the arrow B does not reach a bottom of the narrow groove 9 but passes through an upper portion inside the narrow groove 9 and exits the narrow groove 9. Therefore, an effect to lower the temperature of the tread portion becomes insufficient.

As such, as illustrated in FIG. 2(c), the inflow portion 10 is formed on a windward-side-wall of the narrow groove 9, whereby most of the air is taken into the narrow groove 9 and, further, reaches the bottom of the narrow groove 9. Also, another inflow portion 10 is formed on a leeward-side-wall of the groove 9, whereby the air may exits therethrough. Note that, when the inflow portion 10 is not formed on the leeward-side-wall, the air, having nowhere else to go, exits the narrow groove 9 from an end portion of the leeward-side-wall. Thereby, the effect to lower the temperature of the tread portion may be enhanced.

Especially, in a pneumatic tire for a construction vehicle, since a portion denoted by X of the tire on a vehicle side (on a side opposite to the tread surface) in the figure is not covered by the vehicle but exposed, the effect of the present invention remarkably appears.

Referring now to FIG. 3, a numerical analysis of an air velocity vector inside the narrow groove 9 will be described.

FIG. 3(a) illustrates the narrow groove 9 inclined at an angle of 30 degrees with respect to the tire width direction and having no inflow portion 10, and FIG. 3(b) illustrates the narrow groove 9 having the inflow portions 10 formed both on the windward-side-wall and on the leeward-side-wall. FIG. 3(c) illustrates an air flow rate. Note that the groove 9 is 200 mm in length in a longitudinal direction, 10 mm in width, and 100 mm in depth, and inclined at the angle of 30 degrees with respect to the tire width direction. Also, the inflow portion 10 is 50 mm in length (along the longitudinal direction of the narrow groove 9), 50 mm in width, and 20 mm in maximum depth.

As illustrated in FIG. 3(a), when the inflow portion 10 is not formed, the air is hardly taken into the narrow groove 9.

As illustrated in FIG. 3(b), on the other hand, when the inflow portions 10 are formed, the air velocity vector is maximized in the proximity of the inflow portion 10 formed on the windward-side-wall of the groove. Then, the air is taken into the narrow groove 9, and the air velocity vector increases again in the proximity of the inflow portion 10 formed on the leeward-side-wall of the groove.

When the inflow portion 10 is formed on one of the windward-side-wall of the narrow groove 9 and the leeward-side-wall, the pneumatic tire may be mounted such that the inflow portion 10 is positioned on the windward-side-wall of the narrow groove 9.

Note that, since forming the inflow portion 10 either on the windward-side-wall of the narrow groove 9 or on the leeward-side-wall causes a directional pattern and a reduction in convenience, it is preferable, as illustrated in the figure described above, to form the inflow portion 10 both on the windward-side-wall of the narrow groove 9 and on the leeward-side-wall, so as to have a non-directional pattern.

Also, while the inflow portion 10 formed on the windward-side-wall of the groove 9 acts to allow the air to flow (acts to take the air) thereinto, the inflow portion 10 formed on the leeward-side-groove does not act so. Accordingly, the air enters the narrow groove 9 via the inflow portion 10 formed on the windward-side-wall, travels through the narrow groove 9, and then exits the inflow portion 10 formed on the leeward-side-wall.

The width w9 of the narrow groove 9 is set to be narrower than the depth d9; when the narrow groove 9 is shallow and wide, the air easily enters the narrow groove 9 without the inflow portion 10 and thus the present invention becomes less effective. When the narrow groove 9 is shallow, also, regardless of an increase in a heat-transfer coefficient of the wall of the narrow groove 9, the effect to lower the temperature hardly reaches inside the tread portion.

Since the inflow portion 10 that is satisfactorily small in size relative to a size of the land portion may increase an amount of the air entering the narrow groove 9, forming the inflow portion 10 does not dramatically reduce the size of the land portion. Therefore, the inflow portion 10 has a negligibly small impact on the antiwear performance and the steering stability.

Also, when the inflow portion 10 is formed having a length extending throughout the longitudinal direction of the narrow groove 9, the air in a uniform amount is taken into the entire narrow groove 9 across the longitudinal direction thereof. The air taken into the narrow groove 9 cannot flow inside thereof and is hindered from exiting the narrow groove 9. Especially, when the narrow groove 9 is independent (when the either end of the narrow groove 9 is terminated within the land portion without opening to the grooves), this problem becomes significant. Therefore, the inflow portion 10 is preferably formed in a portion of the longitudinal direction of the narrow groove 9.

More specifically, a length 110 of the inflow portion 10 (along the longitudinal direction of the narrow groove 9) is preferably no less than 5 mm and no more than ½ of the length of the longitudinal direction of the narrow groove 9.

Note that the term "longitudinal direction of the narrow groove" means, between the either end of the narrow groove (either opening when the either end is open), a direction along a straight line connecting middle points of walls facing each other across the bottom of the narrow groove 9.

Note that the inflow portion 10 becomes smaller in size in proportion to a wear amount of the tread portion, reducing an effect to take the air in, i.e., a dissipation performance. However, since the amount of the heat generated in the tread portion also reduces in proportion to the wear amount of the tread portion, it is not necessary to design the inflow portion 10 of a brand new tire to be large in preparation for the wear.

Preferably, the narrow groove 9 is closed during ground contact. More specifically, the width w9 of the narrow groove 9 is preferably about 10 mm to 20 mm. When the narrow groove 9 is closed during the ground contact, the rib-shaped central land portion 6 becomes continuous, enhancing the rigidity of the land portion and improving the antiwear performance.

The following is a description of each of variations of the inflow portion 10 with reference to FIG. 4 to FIG. 7. Arrows in the figures denote a direction of an airflow.

When the narrow groove 9 is formed extending in a direction inclined with respect to the tire width direction, the inflow portion 10 may be formed at an end of one of the walls of the narrow groove 9 where the air hits first as illustrated in FIG. 4(a), or at an end of the other wall where the air hits last as illustrated in FIG. 4(b). Otherwise, the inflow portion 10 may be formed at a central portion of the narrow groove 9 as illustrated in FIG. 4(c).

When the inflow portion 10 is formed both on the windward-side-wall of the narrow groove 9 and the leeward-side-wall, in order to avoid having the inflow portions overlapping with each other with respect to the tire circumferential direction (the direction of the airflow), a center point A of the inflow portion 10, which is formed on one of the walls of the narrow groove 9, along the longitudinal direction of the narrow groove 9 and a center point B of the inflow portion 10, which is formed on the other wall of the narrow groove 9, along the longitudinal direction of the narrow groove 9 preferably have a gap therebetween in the longitudinal direction of the narrow groove 9.

More specifically, the inflow portions 10 are preferably formed at the either end of the narrow groove 9 as illustrated in FIGS. 5(a), (b), or preferably formed diagonally opposite to each other at the central portion of the narrow groove 9 as illustrated in FIGS. 5(c), (d). As illustrated in FIG. 5(e), however, the inflow portions 10 may be formed directly in front of each other at the center position of the narrow groove 9; that is, the inflow portions 10 may be formed such that the center points A and B are arranged without a gap therebetween in the longitudinal direction of the narrow groove 9.

A planer shape of the inflow portion 10 observed from the tread surface may be a parallelogram with a pair of opposite sides parallel to the walls of the narrow groove 9 and another pair of opposite sides parallel to the tire circumferential direction as illustrated in FIG. 6(a), or may be a parallelogram with a pair of opposite sides parallel to the grove walls of the narrow groove 9 and another pair of opposite sides inclined with respect to the tire circumferential direction as illustrated in FIGS. 6(b), (c). Or, as illustrated in FIG. 6(d), the planer shape of the inflow portion 10 may be a trapezoid with a lower base opening to the wall of the narrow groove 9 and an upper base positioned opposite to the wall of the narrow groove 9; that is, the trapezoid with a length in the tire width direction gradually reducing from the wall of the narrow groove 9. Or, as illustrated in FIG. 6(e), the planer shape of the inflow portion 10 may be a trapezoid with the upper base opening to the wall of the narrow groove 9 and the lower base positioned opposite to the wall of the narrow groove 9; that is, the trapezoid with the length in the tire width direction gradually increasing from the wall of the narrow groove 9. Or, as illustrated in FIG. 6(f), the planer shape of the inflow portion 10 may have curved nonparallel opposite sides of the parallelogram illustrated in FIG. 6(e). Otherwise, the planer shape of the inflow portion 10 may be semicircular as illustrated in FIG. 6(g) or triangle as illustrated in FIG. 6(h).

A side profile of the inflow portion 10 in a cross-section perpendicular to the longitudinal direction of the narrow groove, as illustrated in FIGS. 7(a) to (d), is preferably formed such that a depth of the inflow portion 10 gradually increases from one side (a point A in the figure) positioned opposite to the wall of the narrow groove 9 to the other side (a point B in the figure) opening to the wall of the narrow groove 9, where the inflow portion 10 becomes the deepest. However, a bottom plane of the inflow portion 10 may have a flat surface as illustrated in FIG. 7(a) or a curved surface as illustrated in FIGS. 7(b) to (d). As illustrated in FIG. 7(e), also, the depth of the inflow portion 10 may increase in a stepwise manner from the point A to the point B. Or, as illustrated in FIGS. 7(f), (g), the inflow portion 10 may have a constant depth between the point A and a point C and a depth gradually increasing from the point C to the point B.

Or, as illustrated in FIG. 7(h), the inflow portion 10 may have a depth gradually increasing from the point A to the point C and a constant depth between the point C and the point B. As illustrated in FIG. 7(i), otherwise, the inflow portion 10 may have a constant depth between the point A and the point B.

Figure 8:
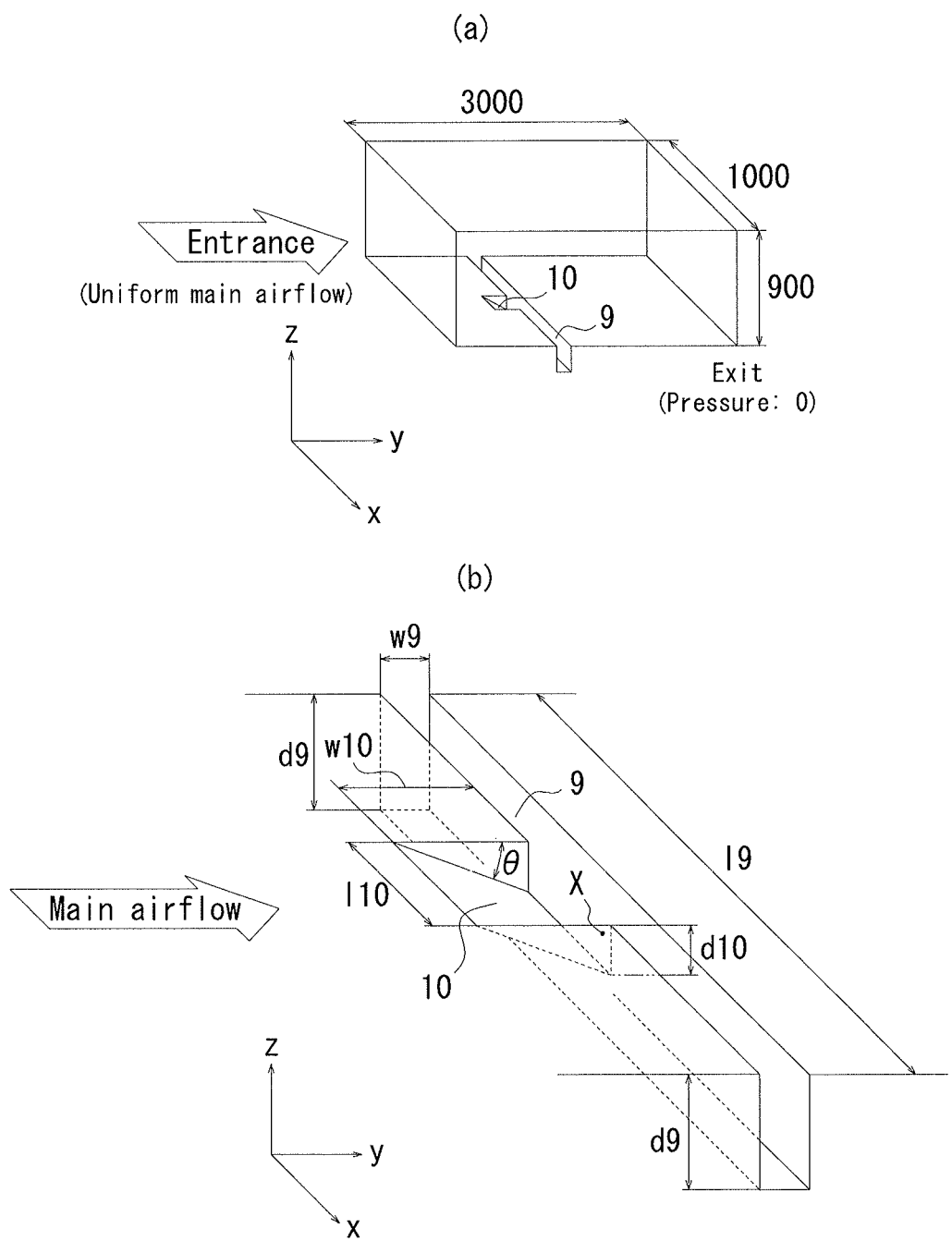
FIGS. 8($a$), ($b$) are diagrams illustrating a model used for a simulation of the present invention.

The following is a description of a simulation conducted by the inventor using a model illustrated in FIG. 8.

FIG. 8(a) is a schematic view of the model of the simulation, and FIG. 8(b) is a detailed view of the narrow groove 9 and therearound. As illustrated in FIG. 8(a), it is assumed that, in a space of 1000 mm×3000 mm×900 mm over the narrow groove 9, a main airflow uniformly travels in a y direction from a windward side (an entrance) and has a 0 pressure on a leeward side (an exit). As illustrated in FIG. 8(b), also, the inflow portion 10 is formed at a central portion of the windward-side-wall of the narrow groove 9. The bottom plane of the inflow portion 10 is sloped. Sizes of the narrow groove 9 and the inflow portion 10 of this model are as shown in Table 1.

TABLE 1

| | |
|---|---|
| Length of narrow groove l9 [mm] | 1000 |
| Width of narrow groove w9 [mm] | 20 |
| Depth of narrow groove d9 [mm] | 100 |
| Length of inflow portion l10 [mm] | 50 |
| Width of inflow portion w10 [mm] | 20-100 |
| Depth of inflow portion d10 [mm] | 20 |

Assuming the air that flows during tire rotation as the main airflow (uniform flow), an average velocity of a part of the main airflow traveling in a z-direction when passing a measuring point X illustrated in FIG. 8(b) after entering the narrow groove 9 via the inflow portion 10 is used as an indicator of the amount of the air entering the narrow groove 9.

Figure 9:
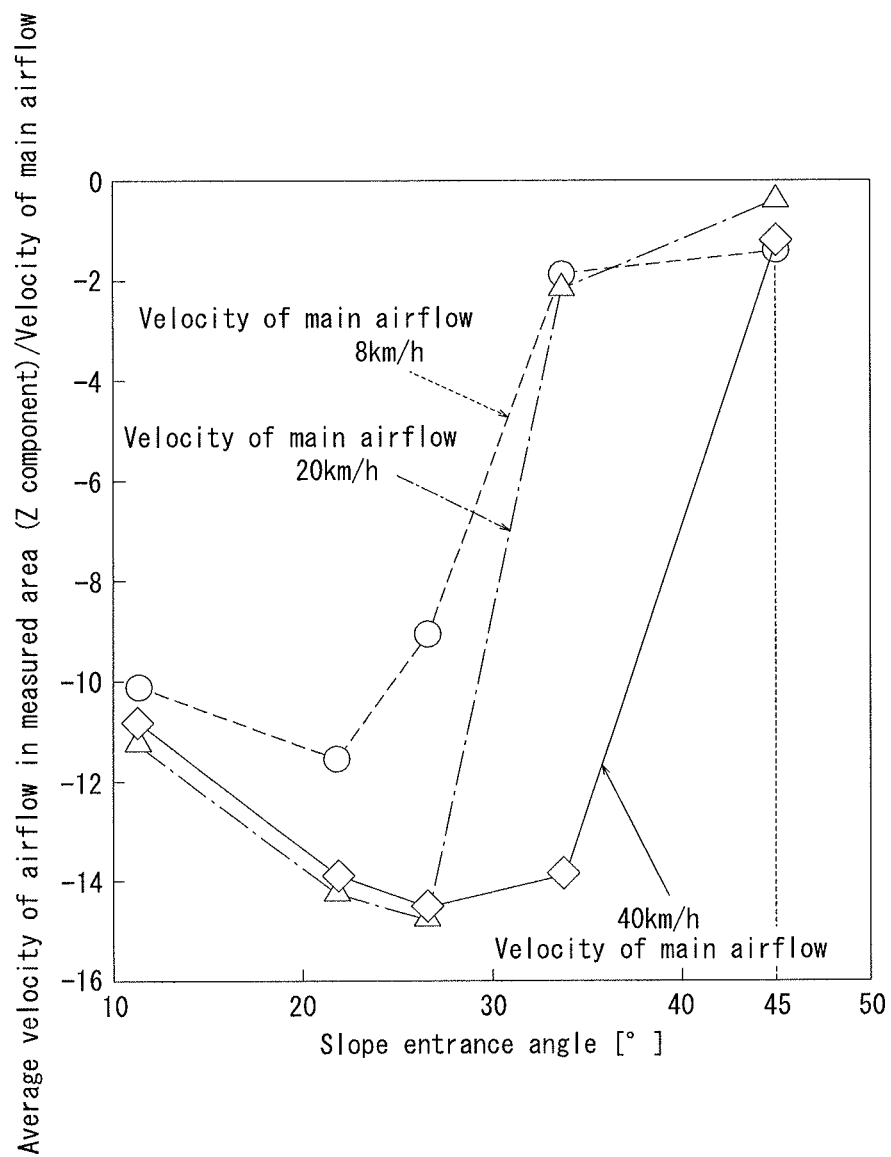
FIG. 9 is a graph illustrating an effect of a slope angle of the inflow portion.

The depth d10 of the inflow portion was maintained constant and the width w10 was varied such that a slope angle θ of the inflow portion 10 was varied for comparison of changes of the amount of the air entering the narrow groove 9 in relation to the slope angle θ. As a result as illustrated in FIG. 9, it was found that, although the amount of the air entering the narrow groove 9 increases in proportion to the slope angle θ until reaching a maximum amount, which is when the angle θ is between 20 and 30 degrees, the amount of the air sharply decreases with the slope angle θ larger than those due to separation of the main airflow at the entrance. It was also found that the slope angle that allows the maximum amount of the air to enter (i.e., the angle immediately before the separation of the airflow) becomes larger in proportion to the velocity of the main airflow.

Based on the results of the simulation described above, the slope angle θ is preferably no more than 45 degrees. That is, a ratio of the width w10 of the inflow portion 10 to the depth d10, w10/d10, is no less than 1.00.

EXAMPLES

The following is a description of examples of the present invention.

Figure 10:
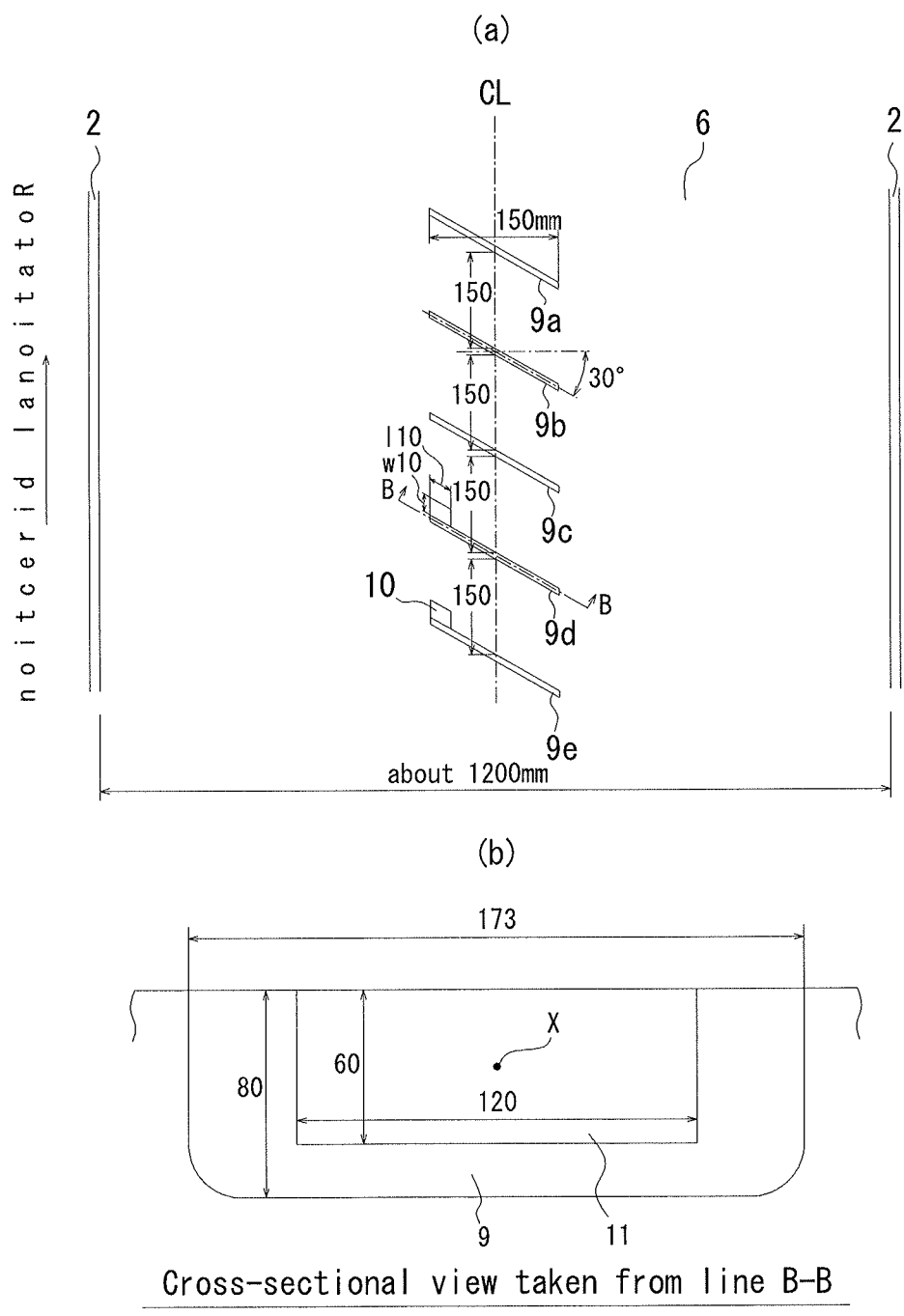
FIGS. 10($a$), ($b$) are diagrams illustrating a part of a tread pattern of a pneumatic tire according to Examples and Comparative Examples.

As illustrated in FIG. 10(a), on the tire equatorial plane CL in the rib-shaped central land portion 6 of an ultra-large ORR (off-the-Road Radial) tire of 59/80R63 in size, five narrow grooves 9a to 9e were formed being inclined at the angle of 30 degrees with respect to the tire width direction at intervals of 150 mm, and the inflow portion 10 with a sloped bottom was also formed on the windward-side-walls of the narrow grooves 9d, 9e. Also, as illustrated in FIG. 10(b), which is a cross-sectional view taken from line A-A of FIG. 10(a), a film heater 11 is provided on the leeward-side-walls of the narrow grooves 9b to 9e. Sizes of the narrow grooves 9a to 9e and the inflow portion 10 are as shown in Table 2. According to the present example, since the narrow grooves exhibit a cooling effect and, also, the walls come into contact with one another within a ground-contact surface, there are less adverse effects such as uneven wear caused by the reduction in the rigidity of the land portion.

TABLE 2

| | |
|---|---|
| Length of narrow groove l9 [mm] | 173 |
| Width of narrow groove w9 [mm] | 10 |
| Depth of narrow groove d9 [mm] | 80 |
| Length of inflow portion l10 [mm] | 40 |
| Width of inflow portion w10 [mm] | 40 |
| Depth of inflow portion d10 [mm] | 15 |

By using this tire, measurement of the heat transfer coefficient of the wall with a main airflow at the velocity of 8 km/h and a main airflow at the velocity of 20 km/h was conducted. The measurement was taken place at a central point X of the windward-side-walls of the narrow grooves 9b to 9e. Results of the measurement are shown in FIG. 11.

Figure 11:
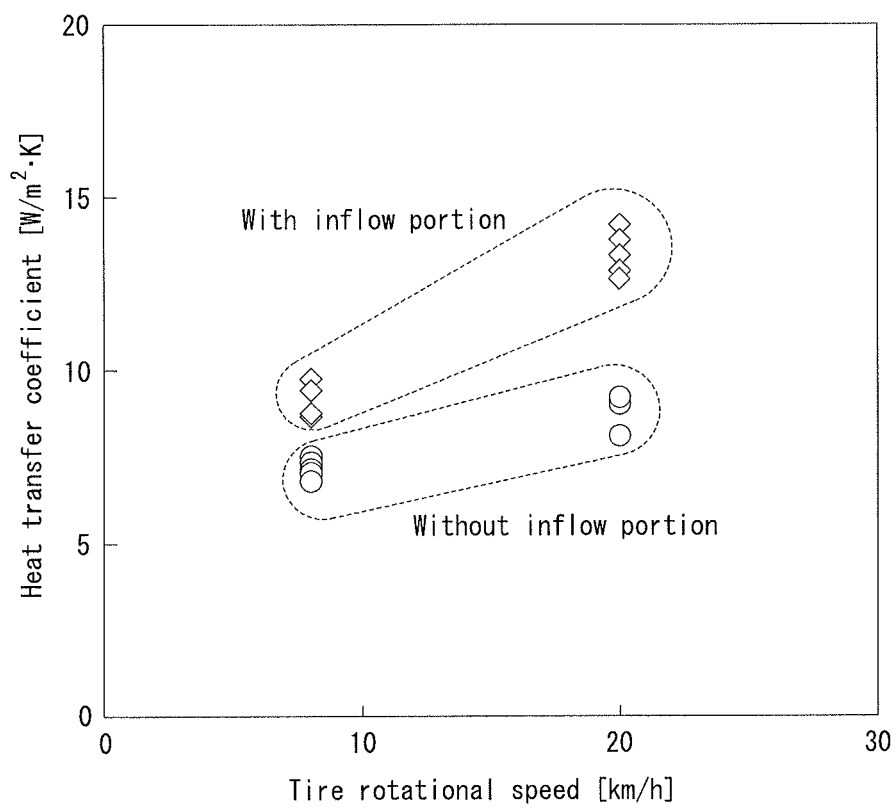
FIG. 11 is a graph illustrating results of Examples and Comparative Examples.

From FIG. 11, it can be seen that, with both the main airflow at the velocity of 8 km/h and the main airflow at the velocity of 20 km/h, the heat transfer coefficients (indicated by squares in the figure) of the narrow grooves 9d, 9e having the inflow portion 10 are higher than the heat transfer coefficients (indicated by circles in the figure) of the narrow grooves 9b, 9c having no inflow portion 10.

Note that, considering that the narrow groove 9a is positioned at the forefront on the windward side and thus receives airflow different from that received by the narrow grooves 9b to 9e, no measurement was conducted for the narrow groove 9a.

Further, the inventor conducted a simulation using the model illustrated in FIG. 8, and results thereof will be described below. Sizes of the narrow groove 9 and the inflow portion 10 of this model are as shown in Table 3. The inflow portion 10 is positioned at a central portion of the longitudinal direction of the narrow groove 9.

TABLE 3

| | | | | |
|---|---|---|---|---|
| Length of narrow groove l9 [mm] | 1000 | 150 | 100 | 75 |
| Width of narrow groove w9 [mm] | 20 | 20 | 20 | 20 |
| Depth of narrow groove d9 [mm] | 100 | 100 | 100 | 100 |
| Length of inflow portion l10 [mm] | 50 | 50 | 50 | 50 |
| Width of inflow portion w10 [mm] | 50 | 50 | 50 | 50 |
| Depth of inflow portion d10 [mm] | 20 | 20 | 20 | 20 |
| l9/l10 | 20 | 3 | 2 | 1.5 |
| d9/d10 | 5 | 5 | 5 | 5 |
| Average heat transfer coefficient [W/m 2K] | 41.56 | 34.77 | 26.67 | 5.88 |

Assuming the air that flows during the tire rotation as the main airflow (uniform flow), an average heat transfer coefficient of a bottom plane of the narrow groove 9 immediately below the inflow portion when the main airflow enters the narrow groove 9 via the inflow portion 10 was calculated by conducting the simulation.

Figure 12:
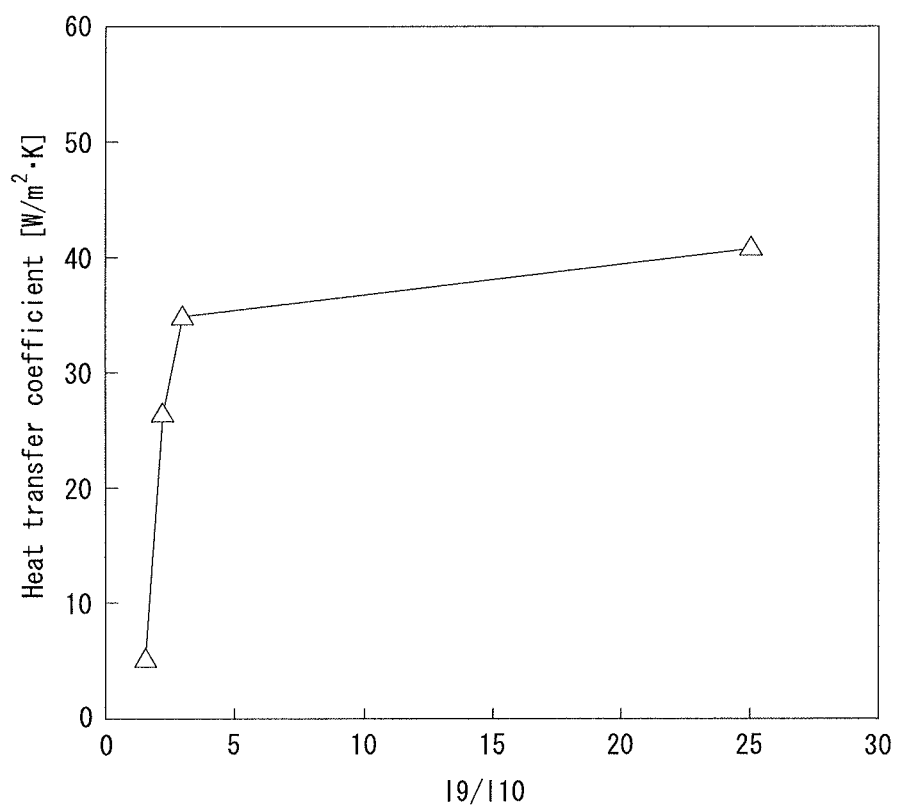
FIG. 12 is a graph illustrating an effect of a length of the inflow portion and a length of the narrow groove.

While the depth d10, the length l10 and the width w10 of the inflow portion 10 and the width w9 and the depth d9 of the narrow groove 9 were maintained constant, the length of the narrow groove l9 was set to 1000 mm, 150 mm, 100 mm, and 75 mm for comparison of changes of the average heat transfer coefficient in relation to the lengths of the narrow groove 9. Results of the simulation are shown in Table 3 and FIG. 12. From the results of the simulation, it was found that the average heat transfer coefficient becomes higher in proportion to the length 19 of the narrow groove 9. It was also found that a ratio of the length 19 of the narrow groove 9 to the length 110 of the inflow portion 10, 19/110, is preferably no less than 2.0 in order to exhibit a remarkable cooling effect.

REFERENCE SIGNS LIST

1 tread surface
2 central circumferential groove
3 side circumferential groove
4 intermediate widthwise groove
5 side widthwise groove
6 rib-shaped central land portion
7 block-shaped intermediate land portion
8 block-shaped side land portion
9 narrow groove
10 inflow portion
11 film heater

The invention claimed is:

1. A pneumatic tire comprising:
a narrow groove formed on a tread surface, the narrow groove extending in a direction inclined with respect to a tire circumferential direction and having a width smaller than a depth; and
an inflow portion opening to the tread surface, the inflow portion being formed on at least one of the walls of the narrow groove facing each other in the tire circumferential direction, wherein:
the inflow portion is formed on one of the walls of the narrow groove, the inflow portion being formed only at an end of the narrow groove which is terminated within a land portion,
a side wall of the one of the walls of the narrow groove extends in a radial direction,
the inflow portion has a deepest portion on a side opening to the wall of the narrow groove, and
a depth of the inflow portion gradually increases toward the side opening to the wall of the narrow groove;
wherein a width of the narrow groove is between 10 to 20 mm.

2. The pneumatic tire according to claim 1, wherein the narrow groove has either end terminated within a land portion.

3. The pneumatic tire according to claim 1, wherein the inflow portion is formed in a portion of a longitudinal direction of the narrow groove.

4. The pneumatic tire according to claim 1, wherein the inflow portion comprises a first inflow portion formed on one wall of the narrow groove and a second inflow portion formed on another wall of the narrow groove.

5. The pneumatic tire according to claim 4, wherein, between a center, along with the longitudinal direction of the narrow groove, of the first inflow portion and a center, along with the longitudinal direction of the narrow groove, of the second inflow portion, a gap is provided in the longitudinal direction of the narrow groove.

6. The pneumatic tire according to claim 1, wherein the depth of the inflow portion the inflow portion at a location where the inflow portion joins the narrow groove is less than a depth of the narrow groove.

7. The pneumatic tire according to claim 1, wherein the inflow portion is open to the tread surface in the tire circumferential direction.

8. The pneumatic tire according to claim 1, wherein a slope of the inflow portion is no more than 45°.

9. The pneumatic tire according to claim 1, wherein a width of the inflow portion is wider than a width of the narrow groove.

* * * * *